US008484605B2

(12) United States Patent
Tan et al.

(10) Patent No.: US 8,484,605 B2
(45) Date of Patent: Jul. 9, 2013

(54) ANALYSIS OF PHYSICAL SYSTEMS VIA MODEL LIBRARIES THEREOF

(75) Inventors: Jilin Tan, Nashua, NH (US); Shangli Wu, Harrison, NJ (US); Roger Cleghorn, Sudbury, MA (US); Raymond Komow, Chelmsford, MA (US); Paul Musto, Hollis, NH (US); Shu Ye, Acton, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 1140 days.

(21) Appl. No.: 12/206,716

(22) Filed: Sep. 8, 2008

(65) Prior Publication Data

US 2010/0070934 A1 Mar. 18, 2010

(51) Int. Cl.
*G06F 17/50* (2006.01)
(52) U.S. Cl.
USPC .......................................... 716/136; 716/110

(58) Field of Classification Search
USPC .............................. 716/136, 110–114; 703/14
See application file for complete search history.

(56) References Cited

U.S. PATENT DOCUMENTS 7,437,693 B1 * 10/2008 Somaya et al. ............... 716/136
2004/0243373 A1 * 12/2004 Sercu et al. ..................... 703/14

* cited by examiner

*Primary Examiner* — Binh Tat
(74) *Attorney, Agent, or Firm* — Rosenberg, Klein & Lee

(57) ABSTRACT

A model library contains one or more storable models of a physical system each constructed by numerically solving relationships between a characteristic of the physical system given a set of model parameters. Such a model may be retrieved from the library according to values assigned to the model parameters and used to determine a corresponding characteristic of the physical system without repeating the numerical solution method originally used to create the model. Instead, a mapping may be applied to the storable model to seamlessly obtain the characteristic upon request.

26 Claims, 16 Drawing Sheets

```
[[Model_Data]
 [Data] 1
  [Freq] 0
   [R]
    9.28969
   [L]
    5.44573e-07
   [G]
    0
   [C]
    6.2873e-11
  [End_Freq]
  [Freq] 1
   [R]
    9.28969
   [L]
    5.44573e-07
   [G]
    1.13886e-11
   [C]
    6.2873e-11
  [End_Freq]
  [Freq] 1000
   [R]
    9.28969
   [L]
    5.44573e-07
   [G]
    1.13886e-08
   [C]
    6.2873e-11
  [End_Freq]
  [Freq] 10000
   [R]
    9.28969
   [L]
    5.44573e-07
   [G]
    1.13886e-07
   [C]
    6.2873e-11
  [End_Freq]
  [Freq] 100000
   [R]
    9.28974
   [L]
    5.44573e-07
   [G]
    1.13886e-06
   [C]
    6.2873e-11
  [End_Freq]
  ............
```

540

552

```
 [Data] 54
  [Freq] 0
   [R]
    4.81688
   [L]
    5.03843e-07
   [G]
    0
   [C]
    7.04428e-11
  [End_Freq]
  [Freq] 1
   [R]
    4.81688
   [L]
    5.03843e-07
   [G]
    1.29399e-11
   [C]
    7.04428e-11
  [End_Freq]
  [Freq] 1000
   [R]
    4.81688
   [L]
    5.03843e-07
   [G]
    1.29399e-08
   [C]
    7.04428e-11
  [End_Freq]
  .....
  [Freq] 100000
   [R]
    4.81688
   [L]
    5.03843e-07
   [G]
    1.29399e-08
   [C]
    7.04428e-11
  [End_Freq]
 [End_Data]
[End_Model_Data]
[End_Model]
```

Layout Cross Section

| Cross Section | | | | | | | | | | | |
|---|---|---|---|---|---|---|---|---|---|---|---|
| Subclass Name | Type | Thickness (MIL) | Dielectric Constant | Loss Tangent | Freq Dep File | Shield | Width (MIL) | Etch Factor (degrees) | Coupling Type | Spacing (MIL) | DiffZ0 (ohm) |
| 1 | SURFACE | | | | | | | | | | |
| 2 TOP | CONDUCTOR ▸ | 1.2 | 1 | 0 | ▸ | | 5.00 | 90 | NONE ▸ | | |
| 3 | DIELECTRIC ▸ | 8 | 4.5 | 0.035 | ▸ | | | | | | |
| 4 VDD | PLANE ▸ | 1.2 | 1 | 0 | ▸ | ☒ | | | | | |
| 5 | DIELECTRIC ▸ | 8 | 4.5 | 0.035 | ▸ | | | | | | |
| 6 L3 | CONDUCTOR ▸ | 1.2 | 1 | 0 | ▸ | | 5.00 | 90 | EDGE ▸ | 10.00 | 99.0844 |
| 7 | DIELECTRIC ▸ | 8 | 4.5 | 0.035 | ▸ | | | | | | |
| 8 GND | PLANE ▸ | 1.2 | 1 | 0 | ▸ | ☒ | | | | | |
| 9 | DIELECTRIC ▸ | 8 | 4.5 | 0.035 | ▸ | | | | | | |
| 10 L5 | CONDUCTOR ▸ | 1.2 | 1 | 0 | ▸ | | 5.00 | 90 | NONE ▸ | | |
| 11 | DIELECTRIC ▸ | 8 | 4.5 | 0.035 | ▸ | | | | | | |
| 12 VCC | PLANE ▸ | 1.2 | 1 | 0 | ▸ | ☒ | | | | | |
| 13 | DIELECTRIC ▸ | 8 | 4.5 | 0.035 | ▸ | | | | | | |
| 14 L7 | CONDUCTOR ▸ | 1.2 | 1 | 0 | ▸ | | 5.00 | 90 | NONE ▸ | | |
| 15 | DIELECTRIC ▸ | 8 | 4.5 | 0.035 | ▸ | | | | | | |
| 16 BOTTOM | CONDUCTOR ▸ | 1.2 | 1 | 0 | ▸ | | 5.00 | 90 | NONE ▸ | | |
| 17 | SURFACE | | | | | | | | | | |

Total Thickness: 65.6 MIL

Layer Type: ALL   Material: ALL   Field to Set: Thickness   Value to Set:

Refresh Materials ->   Update Fields

☐ Show Single Impedance
☐ Show Diff Impedance

OK   Apply   Cancel   Help

800

```
.subckt STL_1S_1R_1
+in1 0 out1 0
*Trapezoidal_Angle_in_Degree = 90
.material mlc conductivity=5.959e+07          ⎫
.material ml1 dielectric=4.5 losstangent=0.035 ⎬ 810
.material ml2 dielectric=1 losstangent=0       ⎭
.layerstack Layerstack                         ⎫
+shield( SL1 mlc 1.8288e-05)                   ⎬ 820
+dielectric( ml1 0.000254 )                    
+dielectric( ml2 1.8288e-05 )                  ⎭
.crosssection                                  ⎫
+rectangle ( mlc 0 0.000254 0.000127 0.000272288 ) ⎬ 830
+Length=length                                 
.ends STL_1S_1R_1
```

FIG. 8

```
900
                                              910
    [Model] test_MS_6S_6R
    [Model_Info]
     [General_Info]
      [ML_Version] 1.0
      [Field_Solver_Used] EMS2D
      [Maximum_Freq] 100.0
      [Model_Type] MSCoupleTrace
      [Num_of_CPWLayer] 0
      [Num_of_DielectricLayer] 2
      [Num_of_ShieldLayer] 1
      [Num_of_Trace] 6
     [End_General_Info]

[Parameter_Info]              920
      [Materials]
       [Material] ml1
        *    min   max   step  step_type  interp_type  ID
        [DielectricConst] 4.5  4.5
        [LossTangent] 0.035 0.035
       [End_Material]
       [Material] ml2
        *    min   max   step  step_type  interp_type  ID
        [DielectricConst] 1  1
        [LossTangent] 0  0
       [End_Material]
       [Material] mlc
        *    min   max   step  step_type  interp_type  ID
        [Conductivity] 5.959 5.959
       [End_Material]
      [End_Materials]
      [LayerStack]
       [Layer] Layer_1_SHIELD
        *    min   max   step  step_type  interp_type  ID
        [Thickness] 0.72 0.72
        [IsShield] YES
        [IsCPW] NO
        [Layer_material] mlc
       [End_Layer]
       [Layer] Layer_2_DIELECTRIC
        *    min   max   step  step_type  interp_type  ID
        [Thickness] 10 12 2 Linear Linear 1
        [IsShield] NO
        [IsCPW] NO
        [Layer_material] ml1
       [End_Layer]
       [Layer] Layer_3_DIELECTRIC
        *    min   max   step  step_type  interp_type  ID
        [Thickness] 0.72 0.72
        [IsShield] NO
        [IsCPW] NO
        [Layer_material] ml2
       [End_Layer]
      [End_LayerStack]
```

FIG. 9A

```
[CrossSection]
    [ShapeLayer] 0
                                                                    930
            min  max  step  step_type  interp_type  ID
    [Distance] 10 12 2 Linear Linear 2
    [Offset] 0 0
    [Thickness] 0.7 1.5 4 Linear Linear 3
    [Height] 0.000254
    [Shape] Component_1_RECTANGLE
    *       min  max  step  step_type  interp_type  ID
        [Width] 4 6 1 Linear Linear 4
        [ShapeLocation] 0 0.000254 0.000254 0.000254 0.000127 0.000272288 0.000254 0.000272288
        [ShapeType] Rectangle
        [ShapeMaterial] Conductor
        [ShapeMaterialName] mlc
    [End_Shape]
    [Shape] Component_2_RECTANGLE
    *       min  max  step  step_type  interp_type  ID
        [Spacing] 5 5
        [Width] 4 6 1 Linear Linear 5
        [ShapeLocation] 0.000254 0.000254 0.000254 0.000254 0.000381 0.000272288 0.000254 0.000272288
        [ShapeType] Rectangle
        [ShapeMaterial] Conductor
        [ShapeMaterialName] mlc
    [End_Shape]
    [Shape] Component_3_RECTANGLE
    *       min  max  step  step_type  interp_type  ID
        [Spacing] 5 5
        [Width] 4 6 1 Linear Linear 6
        [ShapeLocation] 0.000508 0.000254 0.000254 0.000254 0.000635 0.000272288 0.000254 0.000272288
        [ShapeType] Rectangle
        [ShapeMaterial] Conductor
        [ShapeMaterialName] mlc
    [End_Shape]
    [Shape] Component_4_RECTANGLE
    *       min  max  step  step_type  interp_type  ID
        [Spacing] 5 5
        [Width] 4 6 1 Linear Linear 7
        [ShapeLocation] 0.000762 0.000254 0.000254 0.000254 0.000889 0.000272288 0.000254 0.000272288
        [ShapeType] Rectangle
        [ShapeMaterial] Conductor
        [ShapeMaterialName] mlc
    [End_Shape]
    [Shape] Component_5_RECTANGLE
    *       min  max  step  step_type  interp_type  ID
        [Spacing] 5 5
        [Width] 4 6 1 Linear Linear 8
        [ShapeLocation] 0.001016 0.000254 0.000254 0.000254 0.001143 0.000272288 0.000254 0.000272288
        [ShapeType] Rectangle
        [ShapeMaterial] Conductor
        [ShapeMaterialName] mlc
    [End_Shape]
    [Shape] Component_6_RECTANGLE
    *       min  max  step  step_type  interp_type  ID
        [Spacing] 5 5
        [Width] 4 6 1 Linear Linear 9
        [ShapeLocation] 0.00127 0.000254 0.000254 0.000254 0.001397 0.000272288 0.000254 0.000272288
        [ShapeType] Rectangle
        [ShapeMaterial] Conductor
        [ShapeMaterialName] mlc
    [End_Shape]
    [End_ShapeLayer]
  [End_CrossSection]
 [End_Parameter_Info]
[End_Model_Info]
[End_Model]
```

```
(IDL ".subckt STL_1S_1R_1
+in1 0 out1 0
*Trapezoidal_Angle_in_Degree = 90
.material mlc conductivity=5.959e+07
.material ml1 dielectric=4.5 losstangent=0.035
.material ml2 dielectric=1 losstangent=0
.layerstack Layerstack
+shield( SL1 mlc 1.8288e-05)
+dielectric( ml1 0.000254 )
+dielectric( ml2 1.8288e-05 )
.crosssection
+rectangle ( mlc 0 0.000254 0.000127 0.000272288 )
+Length=length
*FieldSolver: EMS2D
*GeneratedByAbiml
```

**The Characteristic Modal Delay, Admittance and
**Impedance Matrices of these Transmission Lines:

*Delay Matrix.
*Td 0 (n=1)
* 5.66393e-09

1130

*Admittance Matrix.
*Y 0 (n=1)
* 0.011818

*Impedance Matrix.
*Z 0 (n=1)
* 84.7523

**The Near-End Crosstalk Coefficent of these Transmission
**Lines based on Near-End Resistance=50 ohm assumption:

*Near-End Crosstalk Coefficent Matrix, Z0*Inv(R+Z0).
* 0 (n=1)
* 0.628711

.ends STL_1S_1R_1
" )

1120

```
.rlgc RLGC_STL_1S_1R_1 ( Length=length N=1 )
.C 0
+ 6.70401e-11
.G 0
+ 0
.L 0
+ 5.27126e-07
.R 0
+ 7.43446
.C 1
+ 6.70401e-11
.G 1
+ 1.22922e-11
.L 1
+ 5.27126e-07
.R 1
+ 7.43446
         ...      ...      ...
.C 1e+08
+ 6.70401e-11
.G 1e+08
+ 0.00122922
.L 1e+08
+ 5.00971e-07
.R 1e+08
+ 15.5713
.C 5e+08
+ 6.70401e-11
.G 5e+08
+ 0.00614608
.L 5e+08
+ 4.89485e-07
.R 5e+08
+ 30.6495
         ...      ...      ...
.C INF
+ 6.70401e-11
.L INF
+ 4.79944e-07
.Td INF
+ 5.66393e-09
.Yc INF
+ 0.011818
.Zc INF
+ 84.7523
.endrlgc RLGC_STL_1S_1R_1
```

FIG. 11

ANALYSIS OF PHYSICAL SYSTEMS VIA MODEL LIBRARIES THEREOF

BACKGROUND

The inventive concept described herein pertains to creating libraries of models of physical systems by numeric methods or direct measurement such that the modeled physical systems that can be reused in contexts similar to those in which the model was originally created.

Numeric analysis techniques are commonly used in engineering and scientific analysis tools to analyze complex mathematical representations of physical systems. For example, in the analysis of high density, multiple gigabit-per-second (GPBS) digital printed circuit board (PCB) and packaging design, numeric solutions for circuit interconnecting structures must be performed to determine behavior at frequency ranges from zero Hz to multiple GHz.

The computational complexity of the numeric solution of such problems is costly in terms of computing resources, especially on those of present desktop computing platforms on which analysis of such problems is preferred. In circuit design, for example, changing the material or the geometry of an interconnect system traditionally requires repeating the numeric methods to determine the effect of the change. In highly automated processes, the full numeric analysis of such problems is computationally prohibitive, especially when computational resources are limited due to the capacity of the platform and the number of separate processes concurrently executed thereon.

SUMMARY

The inventive concept described herein affords user interaction with a computer system to design, model, and analyze physical systems, whereby libraries of models of physical systems are created and utilized for multiple configurations of the physical systems.

Additional aspects and utilities of the present inventive concept may be achieved by providing a method of evaluating of a characteristic of a physical system through a model thereof. A model of the physical system is retrieved from a database, and the retrieved model includes a data structure having at least one value of the characteristic assigned thereto according to physical conditions defined by a set of parameters. Values are assigned to the set of parameters defining the retrieved model and it is determined whether the values assigned to the set of parameters are equivalent to those defining the physical conditions by which the stored value of the characteristic was assigned. Upon a positive determination of such equivalence, the value stored in the data structure is provided as the value of the characteristic.

Additional aspects and utilities of the present inventive concept may also be achieved by providing an apparatus to analyze a characteristic of a physical system. A model library database has stored therein at least one model of the physical system. The model includes a data field containing at least one value indicative of the characteristic of the physical system under conditions defined by a set of parameters. A model library processor determines a value indicative of the characteristic of the physical system other than that contained in the data field of the model under conditions defined by values assigned to the set of parameters.

BRIEF DESCRIPTION OF THE DRAWINGS

The inventive concept disclosed herein is described in conjunction with the accompanying drawings, of which:

FIGS. 5A-5B illustrate an exemplary storage format to store model library object data according to an embodiment of the present inventive concept;

FIG. 7 is an illustration of an exemplary design parameter entry interface according to an embodiment of the present inventive concept;

FIG. 8 is an exemplary format of a model library query according to an embodiment of the present inventive concept;

FIGS. 9A-9B is an exemplary format of a model library index according to an embodiment of the present inventive concept;

FIG. 11 illustrates an exemplary mapped output according to an embodiment of the present inventive concept.

DETAILED DESCRIPTION

Figure 1A:
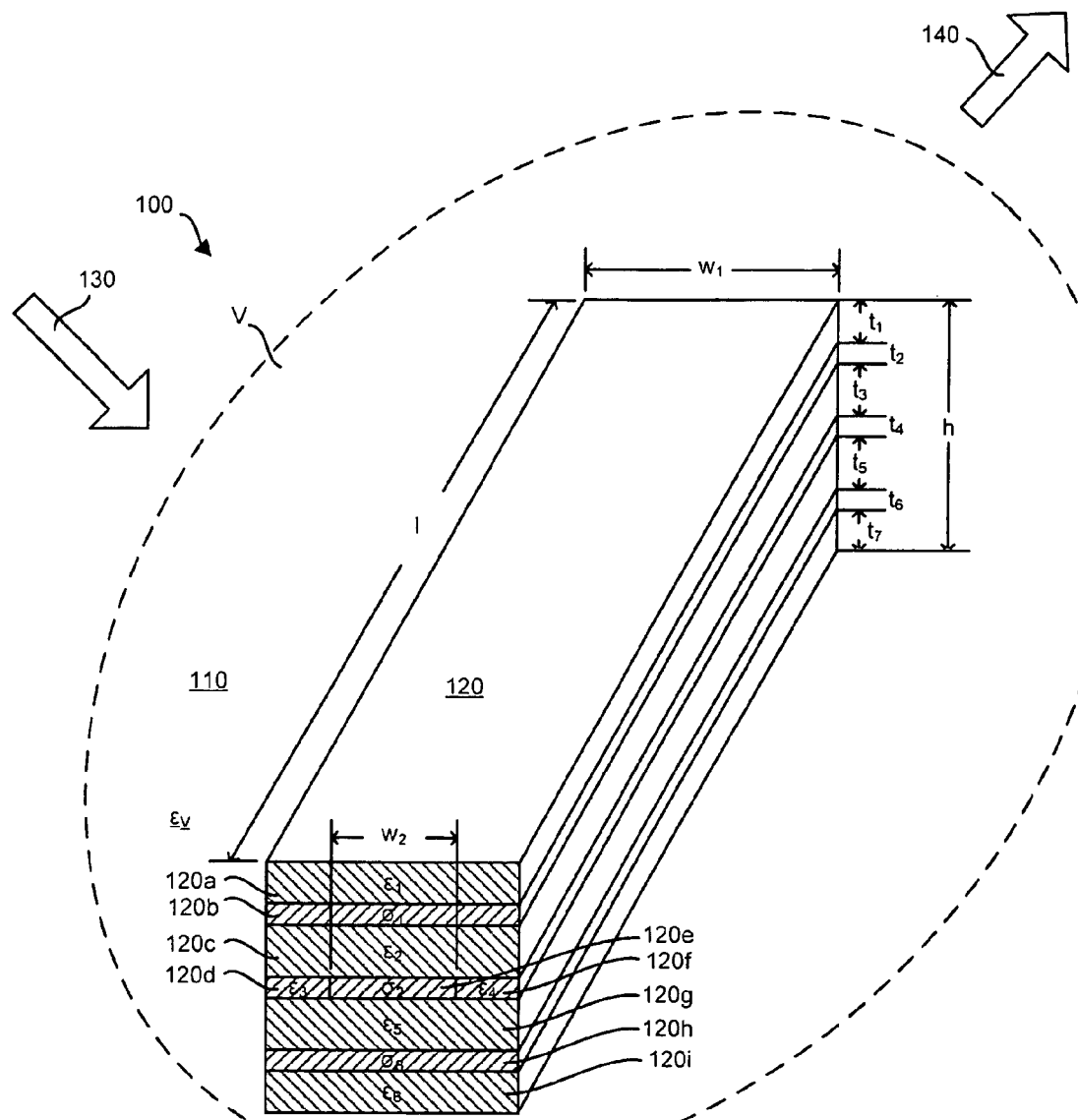
FIG. 1A is a diagram of a physical system of which computer models consistent with the present inventive concept may be implemented.

Reference will now be made in detail to the embodiments of the present general inventive concept, examples of which are illustrated in the accompanying drawings, wherein like reference numerals refer to the like elements throughout. It is to be understood that the term invention, when used herein, refers to the general inventive concept underlying the exemplary embodiments described below, and that the inventive concept is not limited to such illustrative embodiments themselves.

FIG. 1A illustrates an exemplary physical system 100 the behavior or characteristic of which may be evaluated through a numerical model. The physical system 100 may include subsystems, such as indicated at medium 110 and structure 120. It is to be understood that the physical system 100 may be any physical system for which a numerical model may be constructed, including, but not limited to, electromagnetic wave-bearing structures, acoustic wave-bearing structures, load bearing structures, and atmospheric and other gaseous systems. Such models may estimate one or more responses, such as indicated at system output 140, to one or more stimuli, such as indicated at system input 130. Other models may estimate lump or distributed characteristics of the system itself based in its physical state, composition, or structure under conditions specified by parameters provided to the numerical model. Upon review of this disclosure, the skilled artisan will readily recognize physical systems the analysis of which would benefit from embodiments of the present invention. The scope of the present invention is intended to encompass all such embodiments thereof.

For purposes of further description, but without loss of generality, the physical system 100 will be described in terms of an exemplary electromagnetic (EM) transmission line structure 120 immersed in a gaseous medium 110. As illustrated in FIG. 1A, the exemplary transmission line structure 120 has an overall length l, an overall width $w_1$, and an overall height h, and is immersed in a volume V of gaseous medium 110. It is to be understood that any of the dimensions l, h, $w_1$ or V may be modeled as being infinite in extent, and are depicted in FIG. 1A as finite merely for illustrative convenience.

The transmission line structure 120 may be constructed from laminates 120a-120i, each being formed from respective materials with respective thicknesses $t_1$-$t_7$. The materials from which the laminates 120a-120i are formed may be characterized by a physical parameter, such as, but not limited to, respective dielectric constants $\in_1$-$\in_6$ or respective conductivities $\sigma_1$-$\sigma_3$. Additionally, the gaseous medium 110 may have a characterizing parameter, such as a dielectric constant $\in_V$. As is illustrated in FIG. 1A, a stripline 120e having a width $w_2$ is embedded within the transmission line structure 120.

In transmission line design, the geometrical parameters, such as the length l, the thicknesses $t_1$-$t_7$, the stripline width $w_2$, the overall width $w_1$, and the material parameters, such as the dielectric constants $\in_1$-$\in_6$ and $\in_V$, and the conductivities $\sigma_1$-$\sigma_3$ establish the response and characteristic behaviors of the transmission line structure. That is to say, the geometrical and material parameters, as well system state parameters, such as operating frequency and delay times, can be set by a designer to achieve the desired design objectives for the transmission line, such as a specific characteristic impedance of the transmission line, a specific return-loss at a specified design frequency, and others. As such, any parameter that can be set by a designer to achieve one or more design objectives for a physical system being designed is referred to herein as a design parameter. It is to be understood, however, that the invention described herein may be applied to scientific analyses where parameters vary under process control with an analysis objective as opposed to a design objective.

A performance evaluation and/or general analysis of the physical system 100 may require complicated mathematical operations, such as solving differential and/or integral equations, such as, but not limited to, Maxwell's equations, Poisson's equation, and others. Such mathematical operations may be approximated through numerical techniques executed on a computational machine, such as through the finite element method, the finite difference method, and others. Additionally, the solutions to differential and integral equations may require satisfying inhomogeneous boundary conditions through additional numerical techniques, such as applying Green's function via the boundary element method.

As used herein, a model is a combination of data defining one or more of the construction, input stimulus, and state of the physical system 100, as well as one or more operations on the data through which a characteristic, state, or response behavior of the physical system 100 can be determined. Using general notation, a model may be defined by a relationship, $$y = F(x_1, x_2, \ldots, x_\rho), \quad (1)$$

where F returns the modeled characteristic or behavior y, which will be referred to herein as an analysis parameter and may be a complex scalar value, a vector, a complex vector, etc., under the conditions of the physical system 100 set by respective values assigned to the set of model parameters $\{x_1, x_2, \ldots, x_\rho\}$. As used herein, a model parameter is a parameter that can be provided to a model to set conditions under which the physical system is to be modeled. In certain contexts, such as a circuit design context, the model parameters will be the design parameters of the design. In accordance with the present invention, a model is formed so that it may be stored in a library of models such that an analysis value y may be determined in other designs, but without requiring the computational resources of repeating numerical analysis methods.

Figure 1B:
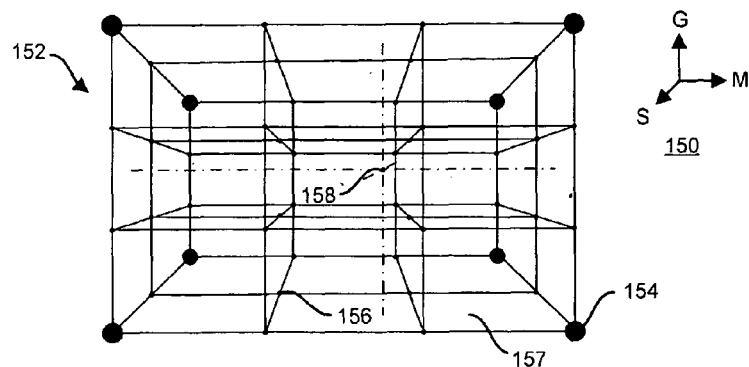
FIG. 1B is a diagram of a hyper-parameter space consistent with the present inventive concept.

Referring to FIG. 1B, there is illustrated an exemplary hyper-parameter space (HPS) 150, which, as used herein, is a λ-dimensional coordinate space taking Λ specified parameters as respective dimensions thereof. For purposes of clarity in the drawing, but not to limit the scope of the present invention, the HPS 150 is illustrated as having dimensions defined by parameters pertaining to the geometry of the physical system 100, collectively illustrated as aligned along axis G, dimensions defined by parameters pertaining to the materials in the construction of the physical system 100, collectively illustrated as aligned along axis M, and dimensions defined by parameters of the state of the physical system (such as, but not limited to, operating frequency, temperature, and pressure), collectively illustrated as aligned along axis S, where the number of G, M, and S dimensions is equal to λ.

The parameter-space topology of the HPS 150 supports the construction of one or more p-dimensional hypercubes, such as illustrated at hypercube 152. A hypercube, as used herein, is a ρ-dimensional subspace in the HPS 150, $\rho \leq \lambda$. In accordance with the present invention, the hypercube 152 is dimensioned by the set of ρ model parameters $\{x_1, x_2, \ldots, x_\rho\}$ and has vertices, representatively illustrated at vertex 154, at which the model parameters are assigned respective values and at which one or more analysis values y of the physical system 100 have been determined under the physical conditions thereof defined by the assigned model parameter values. It is to be understood that while the hypercube 152 is illustrated and described herein as if it were a physical structure in three-dimensional space, such description is used merely to convey the inventive concept in a concise manner. The hypercube 152 may be constructed as a suitable storage structure in a computer memory having constituent storage fields that can be accessed through an addressing scheme that corresponds to the dimensions of the multidimensional hypercube 152.

In accordance with the present invention, the hypercube 152 may be partitioned into a number of ρ-dimensional cells, representatively illustrated at cell 157. At each vertex of the cell 157, representatively illustrated at vertex 156, a previously computed analysis value $y = F(x_1, x_2, \ldots, x_\rho)$ is stored, where such previous computation may be achieved by, for example, numerical methods of solving differential and/or integral equations. The values of y for all of the vertices 154 of the hypercube 152 and the vertices 156 of each cell 157 may be suitably formatted to be stored in a model library database, such as described below in embodiments of the present invention, so that the analysis value y can be subsequently retrieved. Additionally, in accordance with certain embodiments of the present invention, the models and model libraries, such as described in the embodiments below, may be constructed such that an arbitrary analysis value ŷ, i.e., one that has not been previously computed as described above, may be estimated from a mapping in the hypercube 152. That is, in certain embodiments of the invention, $$\hat{y} = H[\{x_1, x_2, \ldots, x_\rho\} | F(x_1^1, x_2^1, \ldots, x_\rho^1), F(x_1^2, x_2^2, \ldots, x_\rho^2), \ldots, F(x_1^n, x_2^n, \ldots, x_\rho^n)], \quad (2)$$

where H is a mapping function that returns an analysis value ŷ, illustrated as coordinate 158 in FIG. 1B, corresponding to a set of model parameters $\{x_1, x_2, \ldots, x_\rho\}$ given previously modeled data $F(x_1^k, x_2^k, \ldots, x_\rho^k)$ stored in the ρ-dimensional hypercube 152. In the event that the model parameters correspond to a coordinate in the hypercube 152 at which y has not been previously computed through a function F, or, alternatively, directly measured, i.e., not in locations in the hypercube 152 corresponding to vertices 154 and 156, the mapping function H may be invoked to return an estimated value ŷ based on known behavior of the analysis parameter y with changes in the model parameters $\{x_1^k, x_2^k, \ldots, x_\rho^k\}$. As such the dimensional formation of a hypercube 152 and a corresponding memory storage scheme therefor, will be referred to herein as a storable model 152 which is utilized in conjunction with the relationships of equations (1) and (2).

Figure 1C:
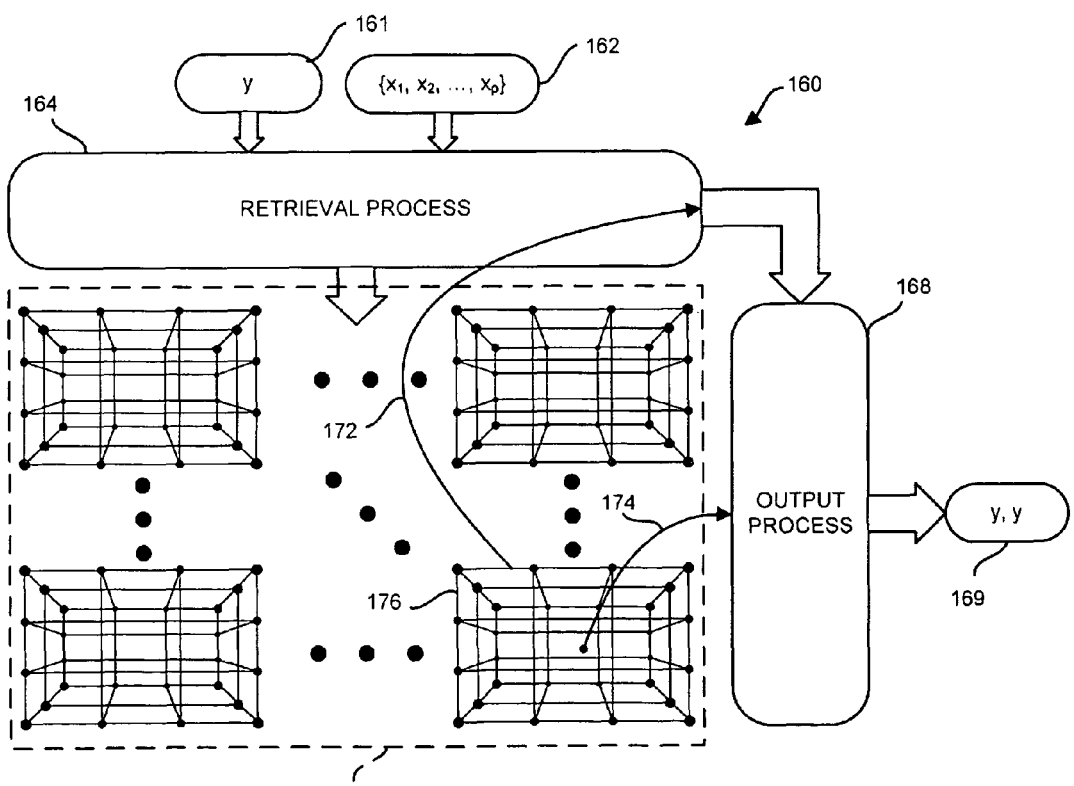
FIG. 1C is a diagram of an exemplary library of models according to an exemplary embodiment of the present inventive concept.

FIG. 1C is a conceptual block diagram of an exemplary embodiment of the present invention. A model library system 160 includes a model library database 170 having storable models, representatively illustrated at storable model 176, stored therein. It is to be understood that storable models 176 in the model library 170 may be constructed in a memory device to be retrieved therefrom conceptually as a hypercube 152, as described above. For example, the memory database 170 may be accessed through a suitable addressing scheme whereby addresses into memory are constructed, at least partially, from a multidimensional index. Additionally, the storable models 176 may overlap or one storable model 176 may be a sub-model of a larger storable model 176. On the other hand, certain of the storable models 176 in model library 170 may be completely independent of other storable models 176. For example, one storable model 176 in model library 170 may be dimensioned through a different set of model parameters than other storable models 176 in model library 170. Numerous variations of and modifications to the structure of the model library 170 and the storable models 176 may be implemented with the present invention without deviating from the spirit and intended scope thereof.

As illustrated in FIG. 1C, a retrieval process 164 is provided an analysis parameter 161 and a set of model parameters 162 by which to query the model library 170. The retrieval process 164 analyzes the analysis parameter 161 and the set of model parameters 162 to determine the nature of the model being sought. For example, the model parameters 162 may be identifiable as variables of material and geometry defining a stripline, and the analysis parameter 161 may be identifiable as a variable of, for example, a characteristic impedance of the stripline. Accordingly, the retrieval process 164 searches the model library 170 for a storable model 176 of a stripline for which the characteristic impedance has been calculated under physical conditions defined by the model parameters 162. If found, the model, illustrated at storable model 176, is retrieved, as illustrated by the directed line 172.

The results of the retrieval process 164 along with analysis parameter 161 and the set of model parameters 162 may be provided to an output process 168 to assign a value 169 to the analysis parameter 161. The output process 168 may determine that the value 169 must be determined by numerical analysis, such as when it is determined by the retrieval process 164 that a storable model 176 matching the analysis parameter 161 and the model parameters 162 is not present in the model library 170. On the other hand, if the retrieval process locates a storable model 176 matching the analysis parameter 161 and the model parameters 162, the output process 168 may return a stored value as the value 169 of the analysis parameter 161, or may return a value estimated from behavior predicted by storable the model 176, as indicated by the directed line 174.

The skilled artisan will readily recognize numerous modifications and variations to adapt the embodiment of the present invention illustrated in FIG. 1C to a variety of scientific and engineering applications. Notwithstanding the number of possible adaptations, the present invention will be further exemplified by way of circuit design and analysis environments. It is to be understood that the description of the particular embodiments of the present invention is not intended to limit application of the present invention to such environments.

Figure 2A:
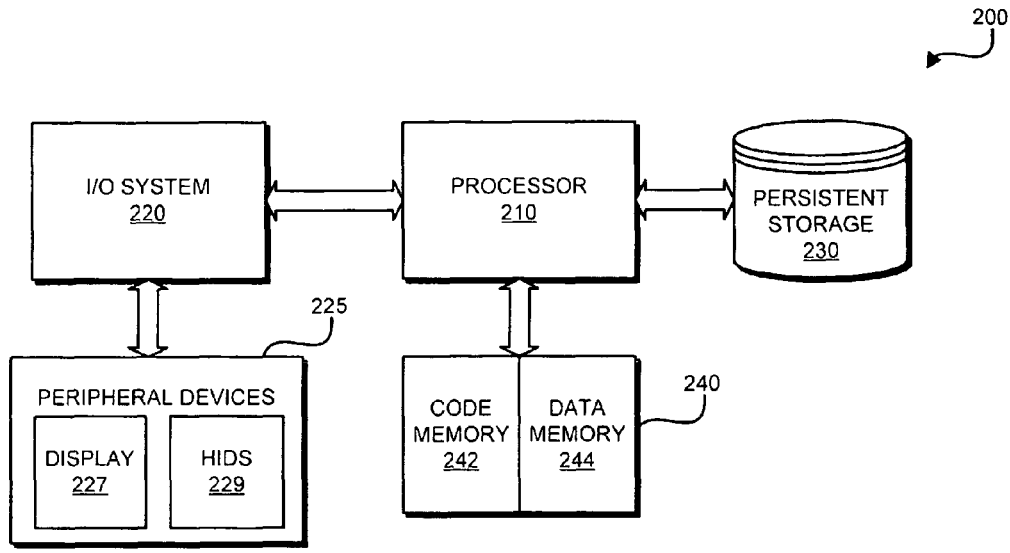
FIGS. 2A-2B are schematic block diagrams of system configurations suitable to practice the present inventive concept.

FIG. 2A illustrates an exemplary system configuration suitable to practice the present invention. An exemplary data processing apparatus 200 of FIG. 2A includes an input/output (I/O) system 220, through which the data processing apparatus 200 may communicate with peripheral devices, collectively represented at block 225, and/or with external network devices (not illustrated). Among the peripheral devices 225 may be a display device 227, on which data are rendered as image data, and one or more Human Interface Devices (HIDs) 229, such as a keyboard, a mouse, a track ball, a stylus, a touch screen, a touchpad, and/or other devices suitable to provide input to the data processing apparatus 200.

The exemplary data processing apparatus 200 of the embodiment illustrated in FIG. 2A includes a processor 210 to, among other things, execute processing instructions that implement various functional modules, such as those described below with reference to FIG. 2B. It is to be understood that the present invention is not limited to a particular hardware configuration or instruction set architecture of the processor 210, which may be configured by numerous structures that perform equivalently to those illustrated and described herein. Moreover, it is to be understood that while the processor 210 is illustrated as a single component, certain embodiments of the invention may include distributed processing implementations through multiple processing elements. The present invention is intended to embrace all such alternative implementations, and others that will be apparent to the skilled artisan upon review of this disclosure.

A storage unit 240 may be utilized to store data and processing instructions on behalf of the exemplary data processing apparatus 210 of FIG. 2A. The storage unit 240 may include multiple memory segments, such as a code memory 242 to maintain processor instructions to be executed by the processor 210, and data memory 244 to store data, such as data structures on which the processor 210 performs data manipulation operations. The storage unit 240 may include memory that is distributed across components, to include, among others, a cache memory and a pipeline memory.

The data processing apparatus 200 may include a persistent storage system 230 to store data and processing instructions across processing sessions. The persistent storage system 230 may be implemented in a single persistent memory device, such as a hard disk drive, or may be implemented in multiple persistent memory devices, which may be interconnected by a communication network.

Figure 2B:
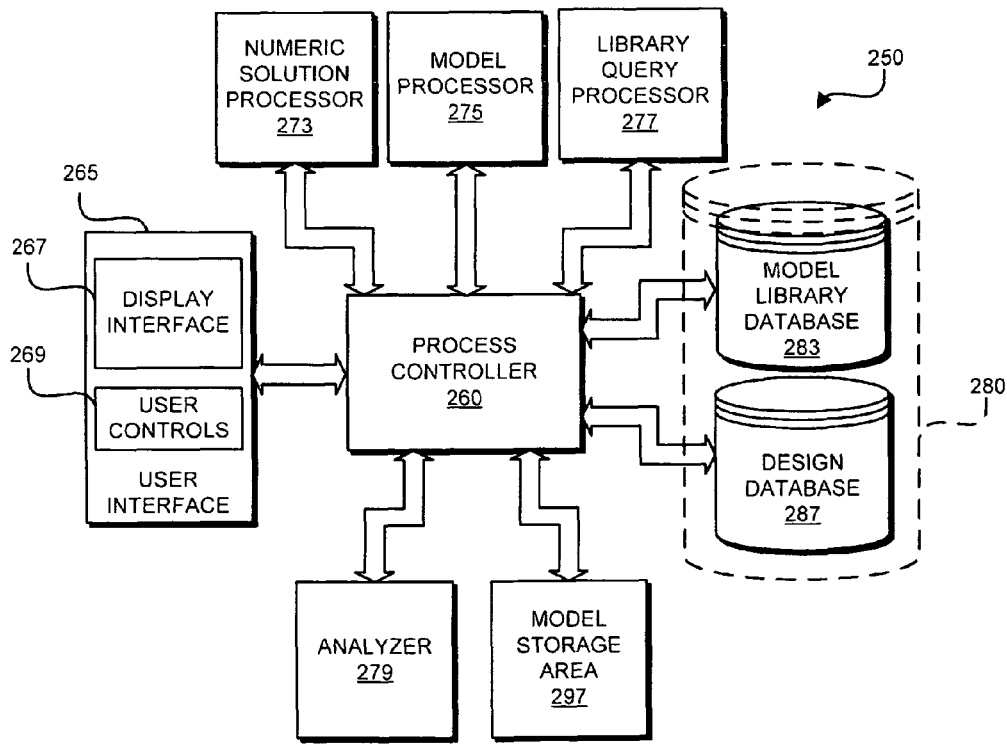

FIG. 2B illustrates an exemplary configuration of functional components suitable to practice certain embodiments of the present invention. The exemplary system illustrated in FIG. 2B may be implemented through processing instructions executed on the processor 210, and in cooperation with other components as illustrated in FIG. 2A, form an exemplary circuit design and analysis system (CDAS) 250 on the exemplary data processing apparatus 200. The exemplary CDAS 250 may be operated by a circuit designer to design and analyze circuit designs and to provide circuit realization data in accordance with the circuit design that is selected by the designer. The realization data may include data formatted to physically fabricate the circuit on one or more circuit-bearing media, such as data to construct component and interconnect mask patterns, component placement location data, packaging data, and any other data necessary in a fabrication process to produce the finished circuit product. The present general inventive concept is not limited by any particular fabrication process, and any suitable fabrication data format may be used with the present general inventive concept without deviating from the spirit and intended scope thereof.

The CDAS 250 may include a process controller 260 to coordinate and control the interoperations of the functional components of the CDAS 250 so as to achieve a fully operational data processing system. For example, the process controller 260 may receive data corresponding to user manipulations of the user interface 265 (to be described below), may format the data into a command and/or data location in memory, and may convey such information to the applicable functional module of the CDAS 250. The process controller 260 may subsequently receive processed data from the applicable functional module and forward the data to another functional module, as well as to indicate such processing on the user interface 265. The process controller 260 will perform other coordination and control operations according to the implementation of the CDAS 250, and such other operations, as well as the implementation of such, can be embodied by a wide range of well-known process control methods and apparatuses. The present invention is intended to encompass all such alternatives of the process controller 260, including multi-threaded and distributed process control methodologies.

As indicated above, the CDAS 250 may include a user interface 265 through which the CDAS 250 interacts with a user. The user interface 265 may be implemented by a combination of hardware devices and suitably programmed processing instructions executed by the processor 210. The user interface 265 may be used to present data to the user in a meaningful form on a display interface 267, such as through graphical representations of circuit schematics, circuit layout diagrams, circuit test bench interfaces, and of data management interfaces such as file directories, and other images recognized by the user. The user interface 465 may interpret user manipulations of any HIDs thereof into messages and instructions that can be recognized by the process controller 260. The user interface 265 may include a plurality of user controls 269 to afford the user interactivity with and control over the CDAS 250. The user controls 269 may include the HIDs described above, and may also include software implemented controls on the display interface 267, such as toolbars and/or buttons, menus of commands, text command entry blocks, and other suitable software controls. The foregoing description of the user interface 265 may be met by a suitably configured graphical user interface (GUI), the implementation details of such will be omitted in the interest of conciseness.

The CDAS 250 may include a design database 287 of circuit objects that maintain all the data necessary to design, analyze, modify, and fabricate an electric circuit per the specifications of a circuit designer. As used herein, a circuit object is a data structure that can be stored in a memory device to contain data of a circuit element so that the circuit element can be viewed, modified, interconnected with other circuit elements, and analyzed in one or more circuit design contexts selected by a user. A circuit object may also contain graphical abstraction information so that a particular circuit element may be presented on the display interface 267 as, for example, a schematic symbol in a schematic entry design context, presented as a footprint in a layout design context, presented as a routing component in a circuit routing design context, and provided as a component model in a circuit analysis and design verification context. A circuit object may also be hierarchical, whereby a circuit object contains other circuit objects of circuit elements interconnected to form a component that has a schematic symbol, layout footprint, and a terminal characteristics model used as a single element in a circuit. An example of such a circuit object is that of an operational amplifier.

The CDAS 250 may further include a model library database 283 of model library objects, which, as used herein, are data structures that can be stored in memory to contain the model data. The model library database 283 and the model objects contained therein may be constructed in the manner of model library 170 and storable models 176 described above with reference to FIG. 1C. For example, if a circuit design includes a circuit object of a transmission line structure, such as structure 120 illustrated in FIG. 1A, a hypercube152 may be constructed to include an analysis parameter at each vertex 154 and 156 corresponding to values assigned respective design parameters defining the location of the vertex 154, 156 in the hypercube 152 and stored in the model library database 283 as a storable model 176. It is to be understood that the design database 287 may interoperate closely with the model library database 283, such as when circuit objects in the design database 287 and model library objects in the model library database 283 have respectively stored therein in a data field containing a reference to a location in one of the databases 283, 287 to the related object in the other one of the databases 283, 287. As such, the model library database 283 and design database 287 may be considered, and indeed constructed, as a single database 280. The present invention is not limited to the manner in which the database 280 is constructed, and numerous possibilities of storing circuit data objects and related model library objects can be used with the present invention without departing from the spirit and intended scope thereof.

The exemplary model storage area 297 is a work space in memory, such as in data memory 240, in which to store model data during processing. For example, when a storable model 176 is retrieved from the model library database 283, the model may be stored in the model storage area 297 for analysis of the physical system 100. The model storage area 297 may be constructed as fixed allocation blocks in data memory 240, or may be dynamically allocated as needed from a single storage area 295 formed in data memory 240. Numerous memory allocation techniques can be used with the present invention without departing from the spirit and intended scope thereof.

Figure 3:
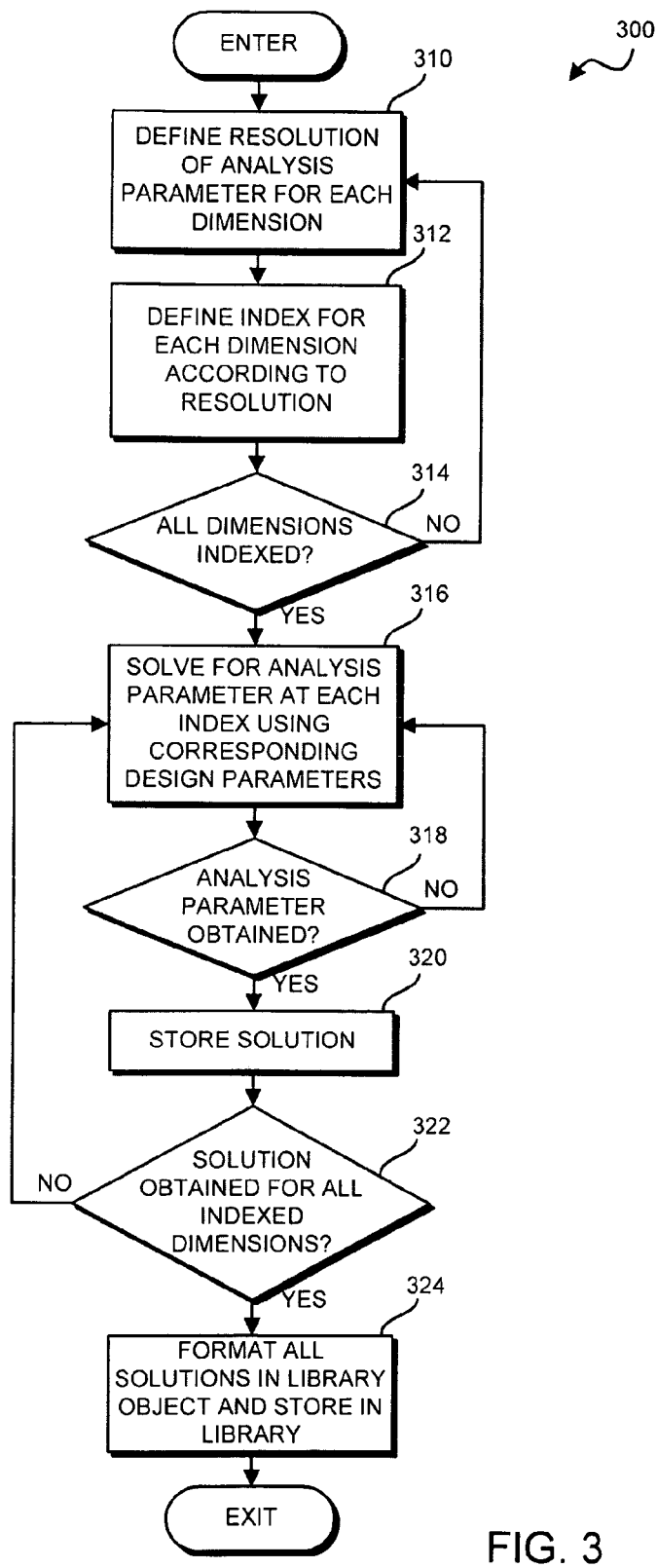
FIG. 3 is a flow diagram illustrating an exemplary model library object creation process according to an embodiment of the present inventive concept.

As illustrated in FIG. 2B, the exemplary CDAS 250 includes a numeric solution processor 273 to execute numeric methods suitable to determine precise analysis parameters from a set of design parameters, such as discussed above with reference to equation (1). The numeric solution processor may execute one or more numeric methods such as, but not limited to, the finite element method, the finite difference method, and the boundary element method. The present invention is not limited to the numeric methods performed by the numeric solution processor 273, and an exemplary process 300 by which suitable numeric methods may be implemented in embodiments of the present invention is illustrated in FIG. 3.

The exemplary numeric solution model process 300 defines a resolution of the desired output parameters in a corresponding HPS 150 at operation 310. That is, for each design parameter defining a dimension of a hypercube 152, a user may establish a resolution of the desired analysis parameter by way of selection of the resolution for one or more dimensions of the hypercube 152.

Figure 4A:
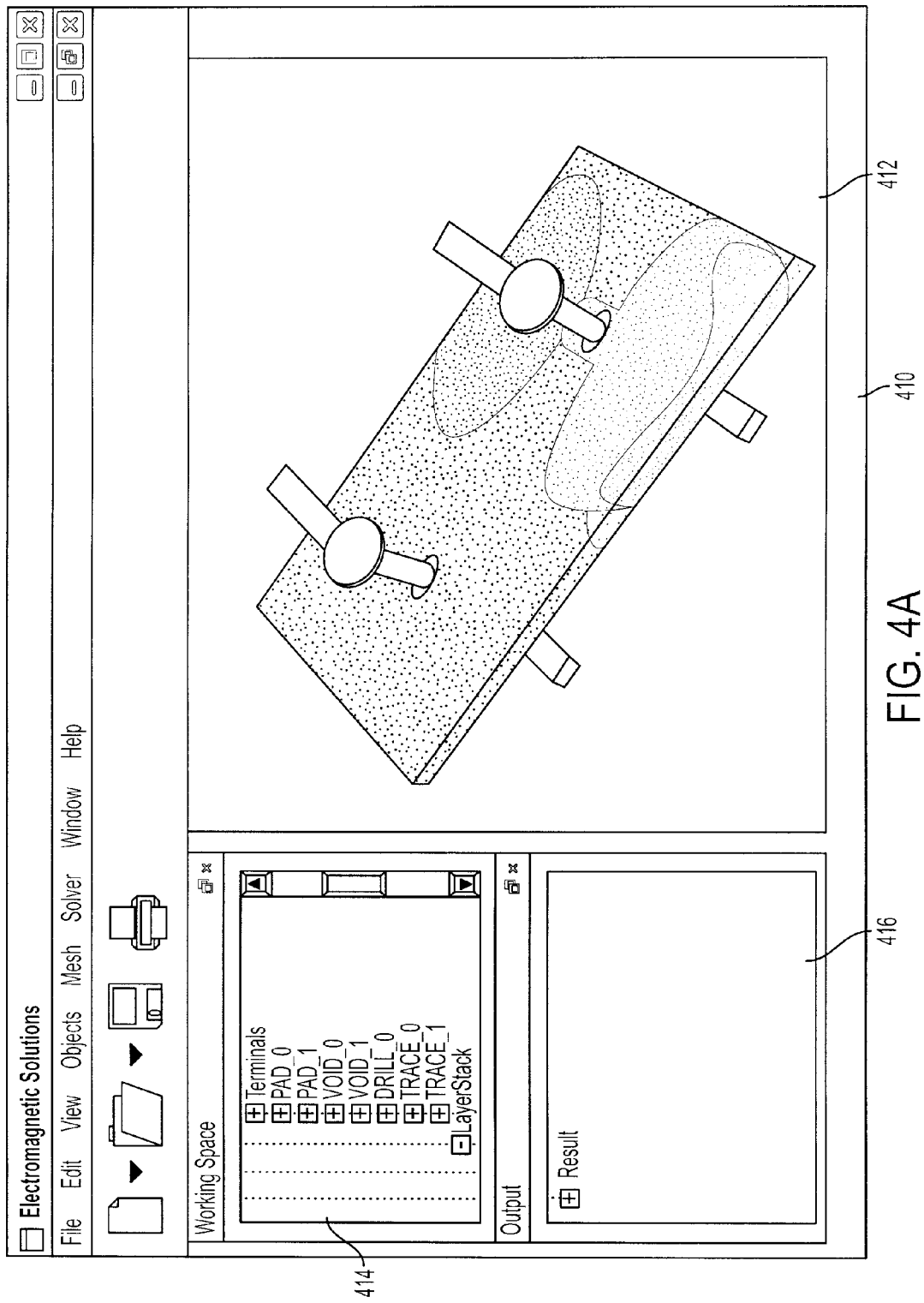
FIGS. 4A-4C are illustrations of an exemplary design parameter and analysis parameter specification entry interface of an exemplary embodiment of the present inventive concept.
Figure 4B:
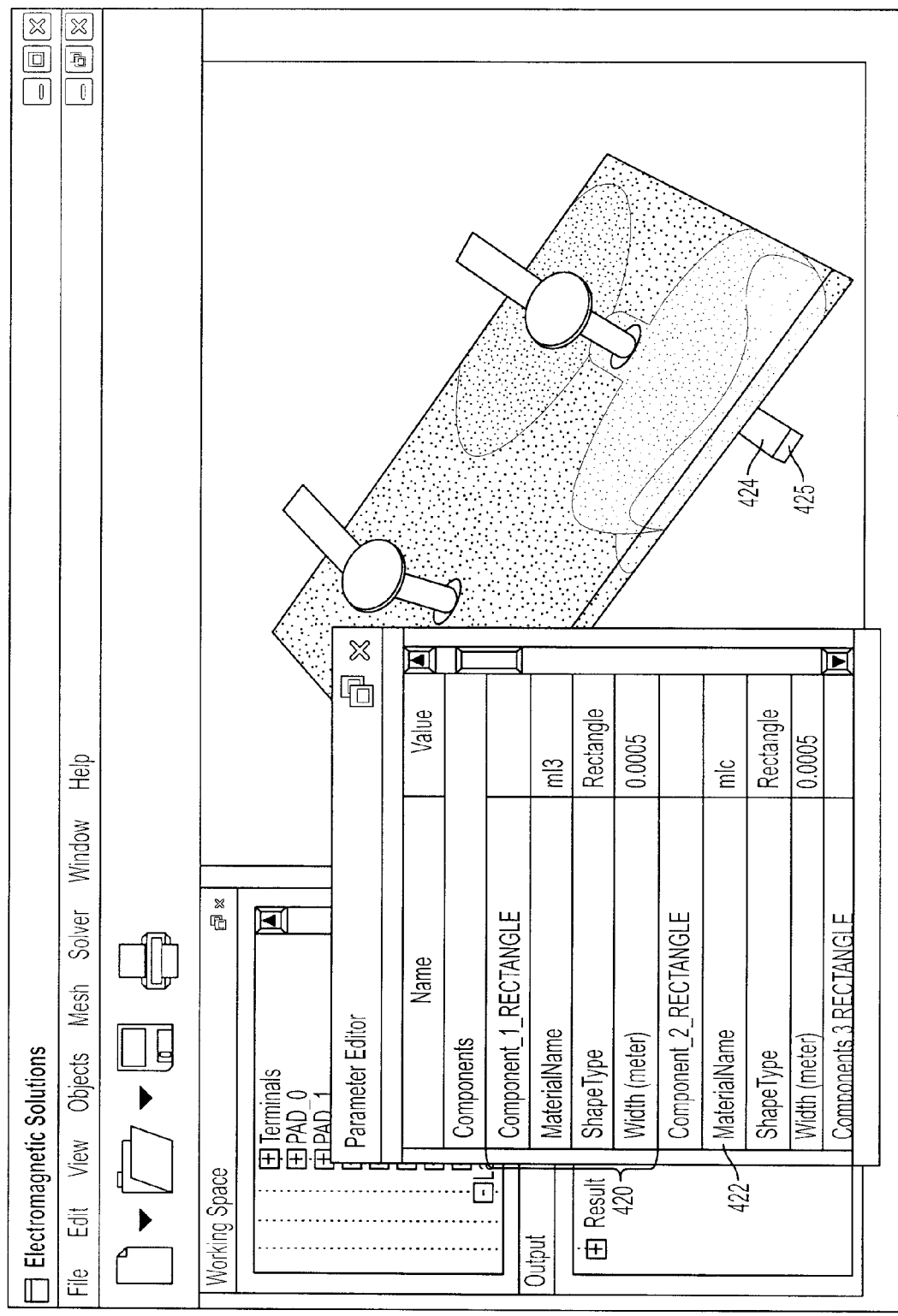
Figure 4C:
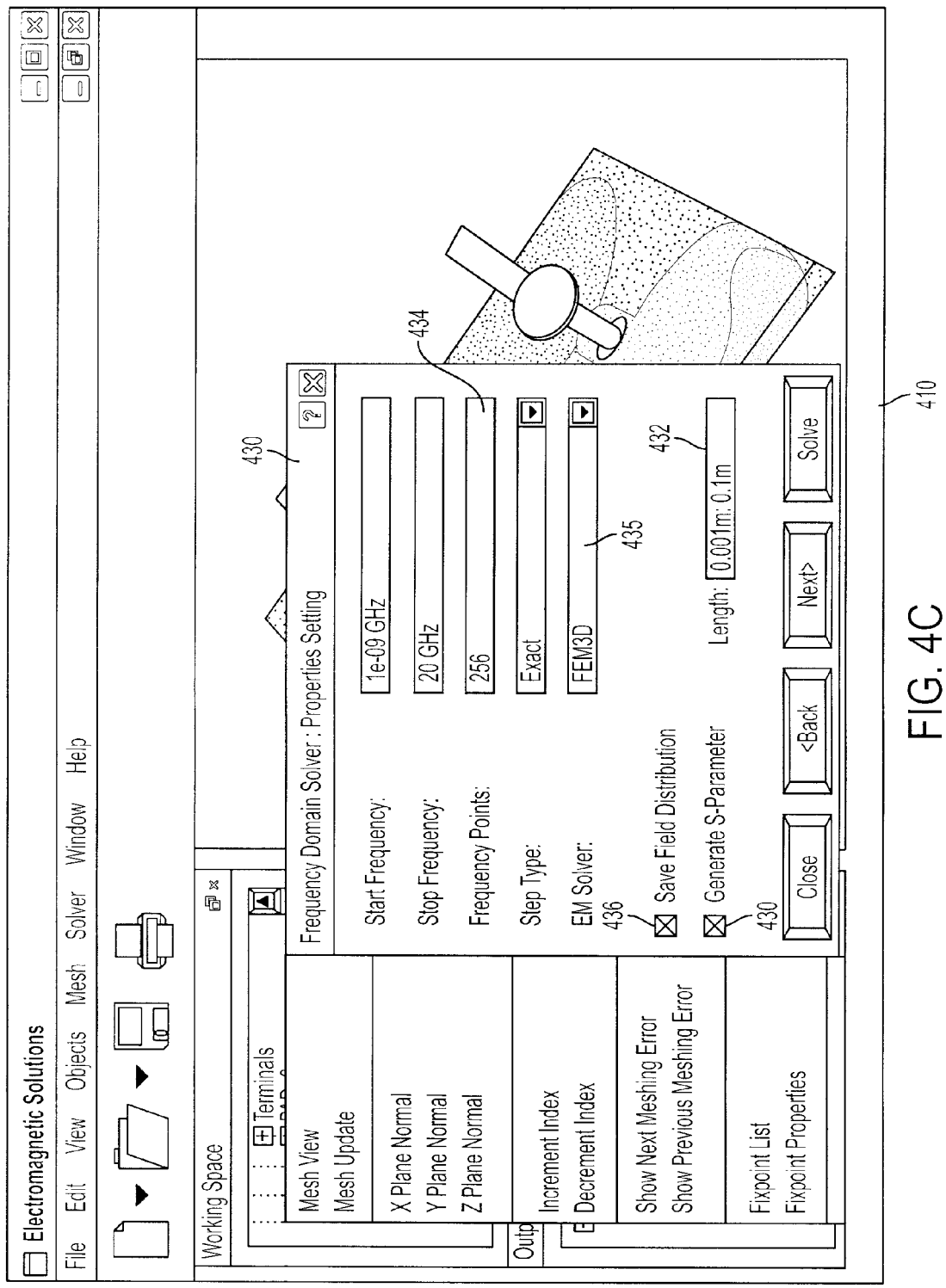

Referring to FIGS. 4A-4C, there is illustrated an exemplary EM solver user interface 410 by which design parameters and numeric analysis parameters may be provided to the numeric solution processor 273. The EM solver user interface 410 may be presented on the user interface 265 illustrated in the exemplary CDAS 250. As is illustrated in FIG. 4A, the EM solver user interface 410 may include a graphical view pane 412 through which a visual representation of the system or subsystem of interest may be presented. Additionally, the user interface 410 may include suitable controls that, for example, allow the user to navigate through circuit objects in the design through a navigation pane 414, and allow the user to assess numeric results through an output pane 416. In certain embodiments of the present invention, the solution data produced by the numeric solution processor 273 may be presented graphically with the system representation in the graphical view pane 412, such as by the shading illustrated in FIGS. 4A-4C.

As illustrated in FIG. 4B, the user may enter design parameter values, representatively illustrated at 422, on which to perform a numeric solution of an analysis parameter. The values of design parameters in the parameter set 420 may be input and modified by the user and may include such design parameters as "MaterialName," specifying a material from which a trace 424, of which the component rectangle 425 is a cross-section, is formed, "ShapeType," indicating the shape of the component or region of interest, and "Width" specifying the width of the rectangle 425. These parameters and user-assigned values thereof may be stored in the storable model 176 as, conceptually, the coordinates of the hypercube 152.

Referring to FIG. 4C, there is illustrated an interface 430 by which a user may enter one or more values of analysis parameter specifications, representatively illustrated at parameter input block 434. In the example of FIG. 4C, the frequency band of interest is selected by the user, and the user further specifies the frequency resolution by way of the parameter "Frequency Points," of data field 434. The user may also select a desired numerical analysis technique, such as a three-dimensional finite element method (FEM3D) by way of control 435. In the illustrated example, the user has also selected, by way of checkboxes 436 and 438 that the EM field distribution and the S-parameters, respectively, of the system being considered are to be stored with the storable model 176. The user may further specify variations of parameters for purposes of analysis, such as the transmission line length at parameter entry block 432. The parameter entry described with reference to FIG. 4A-4C establishes the resolution of the analysis parameters in the model, a value for which is determined for each design parameter, such as those described with reference to FIG. 4B, and each analysis parameter specification, such as those described with reference to FIG. 4C.

Returning now to FIG. 3, an index is defined in operation 312 by which, for example, analysis parameters and associated design parameters may be stored in a model library object in accordance with the resolution defined in operation 410. Using the example of FIGS. 4A-4C, such indexing may be in the form $y_{M,S,W,L,F}$, where M is a material index, S is a shape index, W is a width index pertaining to the shape indexed by S, L is a location index pertaining to a relative location of the shape in the system of interest, and F is an index pertaining to the frequency. Such index construction may be of the form M={ml1, ml2, mlc}, S={rectangle}, W={0.0004, 0.0005, 0.00006}, L={0.0, 0.000254, 0.000127, 0.000027288}, and F={0.0, 100, . . . , 1.0E9, INF}. It is to be noted that each design parameter has a particular type, such as a physical dimension, material, or frequency, which defines a location along a dimension in a HPS 150. These types, and the values therefor, may be assigned suitable addresses or other indices, e.g., W={00, 01, 10}, according to a particular storage scheme of the model library object 176. As will be described below, such indexing may be beneficially implemented to map output parameters from modeled output parameters, as will be described below.

In operation 314, it is determined whether all dimensions have been indexed and, if not, the process 300 repeats from operation 310. If all of the indices have been determined, a solution for each indexed analysis parameter $y_{M,S,W,L,F}$ is computed by the appropriate numerical analysis technique executed by the exemplary numeric solution processor 273. Once a solution is obtained, as determined in operation 318, the solution may be stored, in operation 320, at, for example, a storage location in model storage area 297 suitable to the indexing scheme established in operation 312. Once a solution has been obtained for all indexed dimensions, as determined in operation 322, the solutions held in model storage area 297, for example, may be assembled into a form meaningful to both a user thereof and one that may be stored in the model library database 283, and the exemplary process 300 is exited.

Figure 5A:
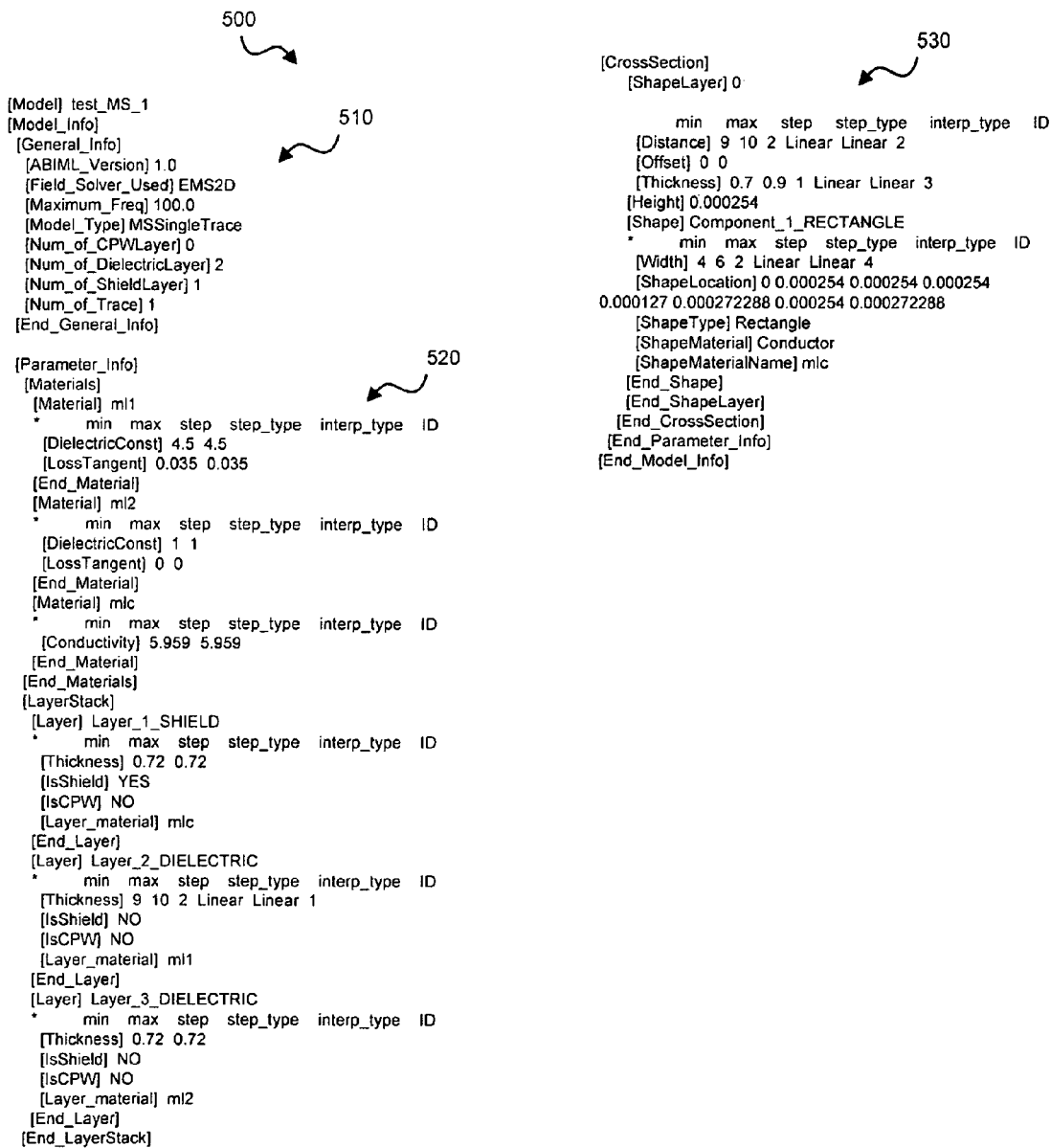

Referring to FIGS. 5A-5B, there is illustrated an exemplary model library object 500 in text form, which may be stored in the model library database 283 as a text file. It is to be understood, however, that the present invention is not limited to a particular file format of model library objects. As is illustrated in FIG. 5A, the model library object 500 may contain header information 510, which describes the basic information of the storable model 176 to which the model library object 500 pertains, and design parameter information 520-540, which describes the design parameters and the values thereof evaluated by the numeric solution processor 273. The exemplary model library object 500 continues in FIG. 5B, where the model data is stored for each indexed analysis parameter 540. It is to be noted that the frequency spectrum of interest was evaluated in 54 different design parameter configurations, as indicated by the [Data] field 552. The [Data] field 552 may be a linear index associated with respective design parameter configurations according to a suitable scheme correlating the index with the parameter configuration. The skilled artisan will readily recognize a wide variety of configurations of model library object 500 such that each output parameter 550 is properly associated with the set of design parameters for which it is a solution, and the scope of the present invention is intended to embrace all such configurations.

As is illustrated in FIG. 2B, the exemplary CDAS 250 includes a library query processor 277 to format and provide query messages to the model library database 287, and to load a result of the query into memory, such as in model storage area 297.

Figure 6:
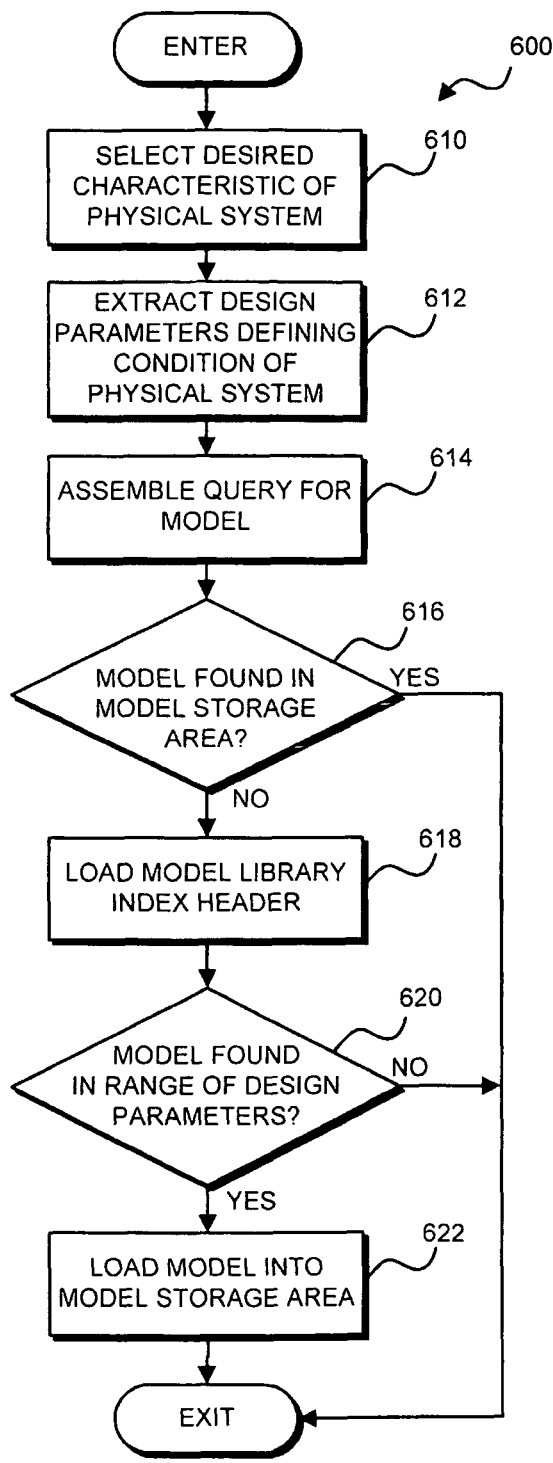
FIG. 6 is a flow diagram illustrating an exemplary model library query process according to an embodiment of the present inventive concept.

FIG. 6 illustrates an exemplary model library query process 600 such as may be executed by library query processor 277. In operation 610, the characteristic of the physical system 100 is selected according to the desired analysis thereof. For example, an analysis of a stripline may require the characteristic impedance thereof and, accordingly, the desired analysis parameter is that of characteristic impedance. In operation 612, one or more sets of design parameters is selected defining the physical conditions of the physical system 100 under which the analysis is to be performed. For example, the design parameters may define different materials and geometries of the stripline for which the characteristic impedance thereof is to be determined.

Referring to FIG. 7, there is illustrated an exemplary user interface 710 by which a stripline may be designed, and, concurrently, by which a query for a model thereof may be invoked. The exemplary user interface 710 allows a user to enter design parameters of the stripline by way of a cross-sectional specification of its construction. Each row, representatively illustrated at row 735, defines the design parameters of a specific layer of the stripline. Each column 721-731 in the user interface 710 allows the properties of each layer of the stripline to be entered by the user. As is illustrated in FIG. 7, the column 732 includes a computed data field 740 of the characteristic impedance of the stripline designed through the interface 710. In certain embodiments of the present invention, the specification of a coupling type in column 730, such as the "Edge" coupling indicated in data field 737, automatically requests a computed value for the characteristic impedance of the stripline. Accordingly, a query including the parameters of the stripline as entered in the user interface 710 is formed and a model of the stripline having the parameters specified is sought and, once located and utilized, the characteristic impedance value is automatically displayed in data field 740. The skilled artisan will readily recognize that by way of the model construction of the present invention, a new value of the characteristic impedance of stripline may be instantly displayed in data field 740 upon changing any of the design parameters accessible through user interface 710.

Returning now to FIG. 6, a query is assembled in operation 614 by which an appropriate model for the analysis parameter given the design parameters is to be located. An exemplary format of a query 800 is illustrated in FIG. 8. As is illustrated in the figure, the query may include material definitions, such as the material definitions 810, geometrical definitions, such as geometrical definitions 820 and 830, as well as other specifications for which a model of the corresponding physical system is sought.

In operation 616 of FIG. 6, it is determined whether a model meeting the query criteria is already loaded into model storage area 297. If so, the query process 600 may be exited, and analysis by way of the loaded model may commence. If the model being sought is not loaded in model storage area 297, then the library query processor retrieves a model library header from a model library stored in model library database 283. An exemplary model library header 900 is illustrated in FIGS. 9A-9B. The model library header 900 may include model information data 910 describing general aspects of the model, and parameter information, such as material parameters 920 and geometrical parameters 930. The model information and the parameter information 920, 930 may be analyzed by the library query processor 277 to determine whether the corresponding model encompasses the range of design parameters for which a model is being sought, as illustrated at operation 620. If the design parameters fall within the range of the model the library header 900 describes, e.g., the materials in the layers, the thicknesses of the layers, the locations of the conductors, etc. defined in the model header 900 encompass the parameters passed by the query 800, the corresponding model is loaded into memory, such as into model storage area 297.

As illustrated in FIG. 2B, CDAS 250 may include a model processor 275 to determine an analysis value from a model of the physical system 100. The model may be stored in model storage area 297, either as a result of a numerical method executed by numeric solution processor 273, or by retrieval from the model library database 283 by the library query processor 277. As discussed above, the analysis value may be determined from a mapping of the form of equation (2).

In certain embodiments of the invention, the mapping H is achieved by interpolation within a hypercube 152. For example, the mapping H may use an interpolation polynomial in Lagrange form:

$$\hat{y} = \sum_{ij;kl;\ldots;pq} y_{ij;kl;\ldots;pq} \alpha_{ij;kl;\ldots;pq}^{m,u,\ldots,v}(\zeta_1, \zeta_2; \eta_1, \eta_2; \ldots; \xi_1, \xi_2), \quad (3)$$

where, $$\alpha_{ij;kl;\ldots;pq}^{m,u,\ldots,v}(\zeta_1, \zeta_2; \eta_1, \eta_2; \ldots; \xi_1, \xi_2) = \quad (4)$$

$$2\rho$$

$$R_i(m, \zeta_1)R_j(m, \zeta_2)R_k(u, \eta_1)R_l(u, \eta_2) \ldots R_p(v, \xi_1)R_q(v, \xi_2),$$

$$i + j = m, \zeta_1 + \zeta_2 = 1; k + l = u, \eta_1 + \eta_2 = 1; \ldots ;$$

$$\text{and } p + q = v, \xi_1 + \xi_2 = 1, \text{ and,}$$

$$R_s(p, \xi) = \begin{cases} \frac{1}{s!}\prod_{k=0}^{s-1}(p\xi - k), & 1 \le s \le p \\ 1, & s = 0 \end{cases} \quad (5)$$

In the above equations, $\zeta_1, \zeta_2, \eta_1, \eta_2, \xi_1$ and $\xi_2$ are normalized parameter values corresponding to the edges of the hypercube containing the desired input design parameter value, and $\alpha_{ij;kl;\ldots;pq}^{m,u,\ldots,v}(\zeta_1,\zeta_2;\eta_1,\eta_2;\ldots;\xi_1,\xi_2)$ is referred to herein as a shape function of interpolation order n. The values $y_{ij;kl;\ldots;pq}$ are the analysis parameters previously computed by, for example, the numeric solution processor 273, at the cell vertices in the hypercube 152, such as cell vertex 154 and 156 illustrated in FIG. 1B.

For a hypercube 152 defined by a single design parameter, i.e., a one-dimensional hypercube, for example, $$\alpha_{ij}^n(\zeta_1,\zeta_2) = R_i(n,\zeta_1)R_j(n,\zeta_2), i+j=n, \zeta_1+\zeta_2=1,$$

and an output value $\hat{y}$ for the design parameter anywhere within the hypercube can be computed by:

$$\hat{y} = \sum_{i,j} y_{ij}\alpha_{ij}^n(\zeta_1, \zeta_2)$$

$$= y_{02}\alpha_{02}^2(\zeta_1, \zeta_2) + y_{11}\alpha_{11}^2(\zeta_1, \zeta_2) + y_{20}\alpha_{20}^2(\zeta_1, \zeta_2)$$

$$= y_{02}R_0(2, \zeta_1)R_2(2, \zeta_2) + y_{11}R_1(2, \zeta_1)R_1(2, \zeta_2) +$$

$$y_{20}R_2(2, \zeta_1)R_0(2, \zeta_2)$$

$$= y_{02}\zeta_1(2\zeta_1 - 1) + y_{11}4\zeta_1\zeta_2 + y_{20}\zeta_2(2\zeta_2 - 1).$$

The equations (3)-(5) may be implemented as suitable processor instructions executed in processor 210 by way of programmed instructions sequences constructed using a suitable programming language.

Figure 10:
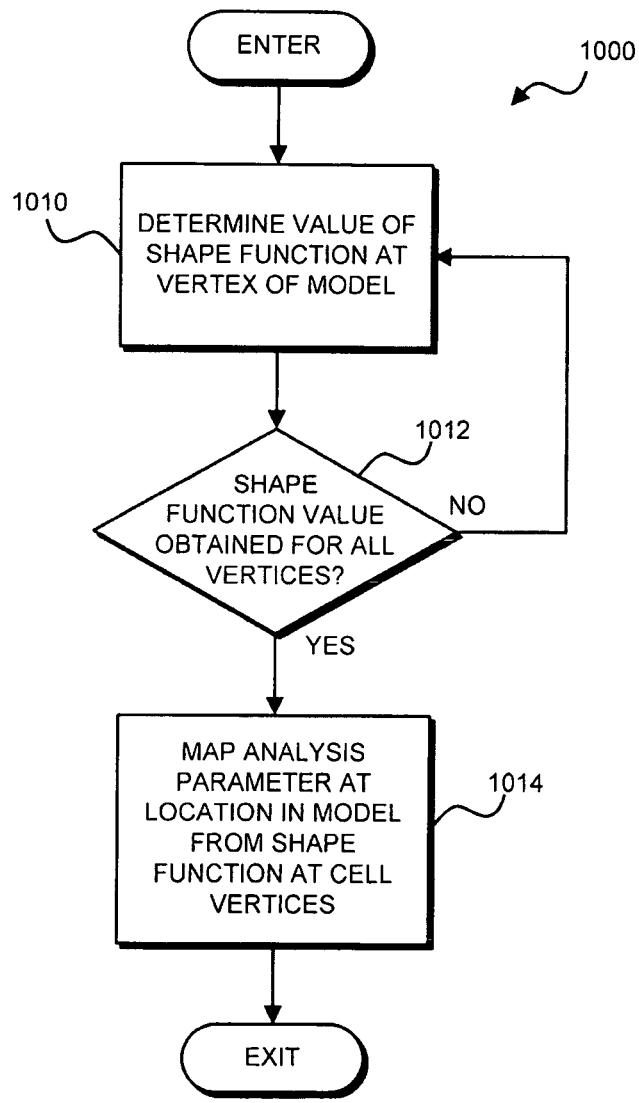
FIG. 10 is a flow diagram of an exemplary mapped output parameter determining process according to an embodiment of the present inventive concept.

FIG. 10 illustrates an exemplary model output process 1000 performed by the exemplary model processor 275. In operations 1010 and 1012, the value of the shape function of equations (4) and (5) is determined at each vertex of the model 152. In operation 1014, equation (3) is applied to the storable model 176 according to the normalized parameter values (e.g., $\zeta_1, \zeta_2$), which define the location of the parameters of the desired analysis value relative to the nearest parameters for which precise values of the analysis parameter was solved or measured. The application of equation (3) produces the mapped analysis parameter $\hat{y}$.

FIG. 11 illustrates an exemplary model output 1100, which includes an output header 1110 describing general information of the model, and analysis parameters 1130, describing such parameters as delay, admittance and characteristic impedance, and spectral parameters 1120, describing, for example, capacitance C, admittance G, inductance L and resistance R for each of a plurality of frequencies. It is to be understood that numerous analysis parameters and output formats may be used with the present invention without deviating from the spirit and intended scope thereof.

As is illustrated in FIG. 2B, the CDAS 250 may include an analyzer 279 to perform various circuit analyses by way of the models. For example, the analyzer may utilize the C, G, L, and R spectral data output by the model processor 275 to produce a spectral impedance graph from, for example, the relationship:

$$Z_0 = \sqrt{\frac{R + j\omega L}{G + j\omega C}}. \quad (6)$$

Such data may be overlaid on a representation of the physical system, such as through the shading illustrated in FIGS. 4A-4C, or may be presented numerically as illustrated in data field 740 in FIG. 7. The present invention is not limited to a particular analyzer or analysis performed thereby, or by the manner in which such analysis is presented to a user.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium indicated above may be any medium on which the instructions may be encoded and then subsequently retrieved, decoded and executed by a processor, including electrical, magnetic and optical storage devices, and wired, wireless, optical and acoustical communication channels. The computer readable medium may include either or both of persistent storage, referred to herein as "computer-readable recording media" and as spatiotemporal storage, referred to herein as "computer-readable transmission media". Examples of computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The computer-readable recording media may be distributed across components, to include such distribution through storage systems interconnected through a communication network. The computer-readable transmission media may transmit encoded instructions on electromagnetic carrier waves or signals, or as acoustic signals through acoustically transmissive media. Moreover, the processor instructions may be derived from algorithmic constructions of the present general inventive concept in various programming languages, the mere contemplation of which illustrates the numerous realizable abstractions of the present general inventive concept.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method of evaluating a characteristic of a physical system through a model of the physical system, the method comprising:
    establishing in a database a plurality of models each defined by a corresponding set of design parameters, each of the design parameters indicating a type of physical condition, at least one of the models being defined by a different combination of design parameter types than another;
    executing a processor to selectively retrieve a model for the physical system from the database according to design parameter type, the retrieved model including a data structure having at least one stored value assigned according to physical conditions defined by values of the set of design parameters;
    assigning respective values including at least one range to an evaluation set of design parameters; and
    determining whether the values assigned to the evaluation set of design parameters encompass the design parameter values of the retrieved model, and based upon the determination, deriving the value of the characteristic being evaluated based on the value stored in the data structure or alternatively computing the value of the characteristic being evaluated independent of the retrieved model.

2. The method as recited in claim 1, wherein the determining includes:
    upon a positive determination that the values assigned to the evaluation set of design parameters encompass the design parameter values of the retrieved model, providing the value stored in the data structure as the value of the characteristic being evaluated; and
    upon a determination that one or more of the values assigned to the evaluation set of design parameters are unequal to the design parameter values of the retrieved model, the value of the characteristic to evaluate being computed from the values assigned to the evaluation set of design parameters.

3. The method as recited in claim 2, wherein the computing of the value of the characteristic from the values assigned to the evaluation set of design parameters includes numerically resolving the value of the characteristic of the physical system from the values respectively assigned the evaluation set of design parameters defining the physical conditions of the physical system and from a predetermined relationship between the characteristic of the physical system and the physical conditions.

4. The method as recited in claim 3 including:
    storing the numerically resolved value of the characteristic in the data structure at a location therein identifiable by values respectively assigned to the evaluation set of design parameters defining the physical conditions of the physical system.

5. The method as recited in claim 3, wherein the resolving includes numerically solving one or both of a differential equation and an integral equation defining the relationship between the characteristic of the physical system and the physical conditions set by the evaluation set of design parameters.

6. The method as recited in claim 2 wherein the computing of the value of the characteristic from the values assigned to the evaluation set of design parameters includes:
retrieving a plurality of stored values of the characteristic and corresponding sets of design parameters from the model;
determining a change in the values of the characteristic corresponding to a change in at least one design parameter in the sets of design parameters; and
estimating the value of the characteristic from the determined change.

7. The method as recited in claim 6, wherein the estimating includes interpolating the value of the characteristic from the stored values of the characteristic and the corresponding sets of design parameters contained in the retrieved model.

8. The method as recited in claim 7, wherein the interpolating includes computing a polynomial of Lagrange form from the stored values of the characteristic and respective pluralities of the sets of design parameters contained in the retrieved model.

9. A non-transitory computer readable medium having encoded thereon processor instructions that, when executed by a processor, performs a method of evaluating a characteristic of a physical system through a model of the physical system, the method comprising:
establishing in a database a plurality of models each defined by a corresponding set of design parameters, each of the design parameters indicating a type of physical condition, at least one of the models being defined by a different combination of design parameter types than another;
retrieving a model for the physical system from the database according to design parameter type, the retrieved model including a data structure having at least one stored value assigned according to physical conditions defined by values of the set of design parameters;
assigning respective values including at least one range an evaluation set of design parameters; and
determining whether the values assigned to the evaluation set of design parameters encompass the design parameter values of the retrieved model, and based upon the determination, deriving the value of the characteristic being evaluated based on the value stored in the data structure or alternatively computing the value of the characteristic being evaluated independent of the retrieved model.

10. An apparatus to analyze a characteristic of a physical system comprising:
a model library database storing therein a plurality of models for the physical system, the models each including a data field containing at least one value indicative of the characteristic of the physical system under conditions defined by a corresponding set of design parameters, each of the design parameters indicating a type of physical condition, at least one of the models being defined by a different combination of design parameter types than another;
a library query processor retrieving at least one model for the physical system from the model library database according to design parameter type; and
a model library processor determining a value indicative of the characteristic of the physical system other than that contained in the data field of the model under conditions defined by values assigned to the set of design parameters; based upon the design parameter values of the retrieved model, alternatively deriving the value indicative of the characteristic from the data field of the retrieved model or computing the value indicative of the characteristic independent of the retrieved model.

11. The apparatus as recited in claim 9, wherein the library query processor retrieves the model for the physical system from the model library database based on the characteristic of the physical system and the set of design parameters.

12. The apparatus as recited in claim 10 further including:
a graphical user interface to assign values to an evaluation set of design parameters and to provide the assigned values to the library query processor.

13. The apparatus as recited in claim 11, wherein the graphical user interface depicts a spatial arrangement of data entry fields that corresponds to a spatial arrangement of the physical system.

14. The apparatus as recited in claim 12, wherein the graphical user interface invokes the library query processor to retrieve the corresponding model upon the values of the evaluation set of design parameters being entered therein.

15. The apparatus as recited in claim 13, wherein the graphical user interface invokes the model library processor to compute the value of the characteristic upon the retrieval of the model.

16. The apparatus as recited in claim 10 further including:
an analyzer to generate analysis data from the value indicative of the characteristic of the physical system provided by the model library processor.

17. The apparatus as recited in claim 16 further including:
a graphical user interface to display a graphical representation of the physical system with a graphical representation of the analysis data.

18. An electromagnetic circuit design and analysis apparatus for analyzing a characteristic of a physical system comprising:
a user interface entering an evaluation set of design parameters of an electromagnetic circuit responsive to user actuation, the evaluation set of design parameters including at least one design parameter having a range of values;
a numerical solution processor determining the characteristic of the electromagnetic circuit from a numerical model of the electromagnetic circuit under physical conditions set by the values assigned to the evaluation set of design parameters;
a model library database storing as a storable model including a data structure containing the characteristic of the electromagnetic circuit determined by the numerical solution processor and the values of the evaluation set of design parameters, the model library database maintaining a plurality of storable models each defined by a corresponding set of design parameters, each of the design parameters indicating a type of physical condition, at least one of the storable models being defined by a different combination of design parameter types than another, the storable models being selectively retrievable according to design parameter type wherein the value of the characteristic being analyzed is alternatively derived from a model retrieved from the model library database or computed independent of the retrieved model, responsive to determination of whether the value assigned to the evaluation set of design parameters encompass the design parameter values of the retrieved model.

19. The apparatus as recited in claim 15 further including:
a library query processor to retrieve the storable model from the database when a set of query parameters correspond in type with the design parameters stored in the data structure.

20. The apparatus as recited in claim 19 further including:
a model library processor to provide from the storable model a value of the characteristic other than that determined by the numerical solution processor.

21. The apparatus as recited in claim 20, wherein the user interface includes a graphical user interface to depict a spatial arrangement of data entry fields in which to enter the design parameters that corresponds to a spatial arrangement of the electromagnetic circuit.

22. The apparatus as recited in claim 21, wherein the graphical user interface invokes the library query processor to retrieve the corresponding model upon the values of the parameters being entered therein.

23. The apparatus as recited in claim 22, wherein the graphical user interface invokes the model library processor to compute the value of the characteristic upon the retrieval of the storable model.

24. The apparatus as recited in claim 23 further including:
an analyzer to generate analysis data from the value indicative of the characteristic of the electromagnetic circuit provided by the model library processor.

25. The apparatus as recited in claim 24, wherein the graphical user interface displays a graphical representation of the electromagnetic circuit with a graphical representation of the analysis data.

26. The apparatus as recited in claim 25, wherein the graphical representation of the analysis data is overlaid on the graphical representation of the electromagnetic circuit.

* * * * *

UNITED STATES PATENT AND TRADEMARK OFFICE
CERTIFICATE OF CORRECTION

PATENT NO. : 8,484,605 B2
APPLICATION NO. : 12/206716
DATED : July 9, 2013
INVENTOR(S) : Jilin Tan et al.

It is certified that error appears in the above-identified patent and that said Letters Patent is hereby corrected as shown below:

In the Claims:
Please amend Claim 9 as follows:
Column 15, line 40: Insert --to-- following "assigning respective values including at least one range".

Please amend Claim 18 as follows:
Column 16, line 60: Insert --;-- following "able according to design parameter type".

Please amend Claim 21 as follows:
Column 17, line 12: please delete "s" in the text as seen: "parameters that correspond[[s]] to a spatial arrangement of the".

Signed and Sealed this
Eighteenth Day of March, 2014

Michelle K. Lee
*Deputy Director of the United States Patent and Trademark Office*